Patented Feb. 12, 1929.

1,702,227

UNITED STATES PATENT OFFICE.

JULIUS CULMANN, OF ROSEBANK, AND EDGAR AHRENS, OF STAPLETON, NEW YORK, ASSIGNORS TO G. SIEGLE CORPORATION OF AMERICA, INC., OF NEW YORK, N. Y., A CORPORATION OF NEW YORK.

NONPOISONOUS COLORING MATTERS FOR COSMETICS.

No Drawing. Application filed June 20, 1927. Serial No. 200,286.

This invention relates to coloring matters and it particularly relates to coloring matters consisting of non-poisonous red pigments used for cosmetics in the form of powder, or pastes, or the like, for beautifying the skin of the face; it being the object of the invention to provide such red coloring matter of natural shade and to render it free of any harmful ingredients.

These pigments are obtained as "lakes" by precipitating solutions of organic coloring matter with metallic salts; the precipitating agent employed in their preparation depends on the nature of the coloring matter.

So simple as the definition of a "lake" may sound, a rather difficult situation prevails if lakes are required which are to be free of poisonous metals and insoluble enough to meet the various hygienic requirements.

Certain red dyestuffs give lakes which would be satisfactory as to insolubility and non-poisonous character, but they cannot be applied for the manufacture of cosmetic articles, such as, lipsticks, rouges, pastes or the like because they exhibit such a peculiar and unusual shade as to give the person, applying the same, a freakish appearance and the other red colors, which would give a lake or pigment of desirable shades, are mostly precipitated with lead salts thereby giving lakes which must be prohibited as materials for cosmetics because the lead, regardless whether soluble or not, may enter into the body and may expose the user to the danger of death by blood poison.

Inasmuch as recently deaths by lead poisoning have actually repeatedly occurred, we have endeavored to produce certain new compositions of coloring matters displaying very desirable red shades, being free of injurious ingredients and being sufficiently insoluble to satisfy the highest requirements called for in the protection of the user's health. We wish to state, however, that we use for the most of these compositions certain new red lakes which we succeeded to provide only after much work and for the better understanding of our invention, we are therefore first going to describe the new process by which we provide said new red lakes.

We make these lakes from eosine by acting on the same under certain well defined conditions with a soluble aluminum salt. Though we are aware that lakes from rhodamin by precipitating them with an aluminum salt have already been made by the prior art, we have selected eosine as the coloring matter, because we realized from many years experience in that line that the present manufacture of eosine-lakes offered a wide field of research for preparing lakes of higher requirements than those exacted by the industry for the manufacture of wall papers, for tinting paint and for the like purposes.

The lakes of eosine for these and similar purposes are made for the greatest part with lead salts, and only to a minor extent with aluminum, tin or zinc. While the lakes of tin or zinc or of any other metal are not desirable because they are liable to exert a corrosive action on the skin and furthermore yield undesirable lakes with a decidedly yellow shade, the lakes, made from eosine by the present art by acting on the same with aluminum salts in the way rhodamin solutions are precipitated, have a too pronounced yellow shade to come into consideration, nor are they so insoluble as necessarily required, it being well known that aluminum compounds do not produce complete precipitation.

Quite in accordance with this fact we did not succeed in obtaining brilliant red lakes from eosine free of undesirable shades, until we found out that we had to adhere strictly to a certain line of steps.

For the better understanding of our invention we will describe one way as an example of how to carry the same into effect. We proceed about as follows:

We prepare a solution of eosine by dissolving 1500 gms. of the same in 15 liters of water, then we add 1500 grams of benzoate of soda, dissolved in 15 liters of water to the eosine, agitate the mixture and add then 1200–1400 grams of aluminum sulphate dissolved in 15 liters of water.

Then, and only then, by causing the substances to act upon each other in this line, do we obtain a precipitate, which, after having been washed with water, upon further examination proves to be a pigment of such pure red that it, together with its satisfactory insolubility, forms an ideal substance for cosmetic preparation. Sodium benzoate may be substituted by any other low priced alkali metal salt of an aromatic mono-basic acid.

We do not care to express any definite reason for the phenomenon that we obtain a precipitate of the described properties only by following exactly the line of the steps pointed out above and that we cannot arrive at the same result by adding the precipitating agents in the reversed order.

We have furthermore found out that the dyestuffs being condensation products of phenols with other substances and having one free carboxylic group, are best suitable for our purposes; such dyestuffs are for instance erythrosine, phloxine, phloxine p, the various bengals, etc., all halogen derivatives of fluorescein, and being water soluble, can be used similarly in the reaction described above.

If we speak of insolubility we do of course not extend the meaning of this term to comprise insolubility under all and any circumstances; we include, however, all such conditions which have to be considered in the use of the lake on the skin of a person.

The lakes, provided by the process described above can be used with excellent results as a pigment for all kinds of red cosmetics, either alone or together with other lakes. The art of making red cosmetics for beautifying lips and the cheeks is a very intricate art and requires much skill and chemical experience in matching of colors and in eliminating any unfavorable influence the shade of one may have on that of another so as to arrive at a certain definite result as desired; below, we give some examples of various compositions in which we use to a considerable extent the lake produced from eosine by the process described above, while another composition, without our new lake, gives also a most desirable shade, which has been asked for by the industry for a long time and which we succeeded in obtaining after great efforts in many directions.

We found that in mixtures with other lakes the most desirable shades are obtained with the aluminum lake of rhodamin precipitated in the usual manner; and with the lake of a red azo-dyestuff obtained by coupling diazotized chlorotoluidine-para-sulfonic acid with beta-naphtol, as described in U. S. P. 733,280, issued on July 7, 1903, to Schirmacher, the azo-dyestuff obtained according to this patent being generally known as "red" for "lake C", this lake being made by precipitating a solution of the "red" with barium chloride on a basis of blanc fix and of aluminum hydrate.

We hold that it is not necessary to go into particulars of the manufacturing of these compositions inasmuch as they can be prepared in many of the well known ways as soon as the proportions of the ingredients are established, it being of course understood that these proportions are not restricted to those set up in the examples because they can be increased or lessened to some extent.

*Example I.*

1 part eosine lake Culmann-Ahrens, .75 part "lake C" made as described above.

*Example II.*

1 part eosine lake Culmann-Ahrens, .75 part aluminum lake of rhodamin.

*Example III.*

1 part aluminum lake of rhodamin, .75 part of "lake C" made as described above.

It will be noted from above examples that besides barium, which can be substituted by any other alkali-earth metal, there is no other metal than aluminum present as an ingredient in these mixtures and that they therefore are harmless.

Moreover, it must be stated that the main body of at least one of the dyestuffs applied in the mixture of the lakes is a halogen derivative or has a carboxylic-group and that the hygienic effect established thereby is increased by the phenolic character of the body of said dyestuffs.

What we claim is:

1. Non-poisonous red coloring matters for cosmetic purposes, said coloring matters comprising lakes having aluminum as a metallic base.

2. Non-poisonous red coloring matters for cosmetic purposes, said coloring matters comprising a mixture of aluminum lakes of red dyestuffs, at least one of said dyestuffs having a halogen atom in its molecule.

3. Non-poisonous red coloring matters for cosmetic purposes, said coloring matters comprising a mixture of aluminum lakes of red dyestuffs, at least one of said dyestuffs having a halogen atom in its molecule and at least one of the same being of phenolic character.

4. Non-poisonous red coloring matters for cosmetic purposes, said coloring matters comprising lakes of red dyestuffs having a halogen atom in their molecules, one of the lakes having aluminum as a base and the other having aluminum and an alkali-earth metal.

5. Non-poisonous red coloring matters for cosmetic purposes, said coloring matters comprising lakes of red dyestuffs having a halogen atom in their molecules, one of the lakes having aluminum as a base and the other having aluminum and barium.

6. Non-poisonous red coloring matters for cosmetic purposes, said coloring matters comprising the mixture of an aluminum lake of a red dyestuff, said lake being the precipitate of a water soluble halogen-derivative of fluorescein with a soluble aluminum salt in the presence of benzoate of soda, and of the aluminum lake of another red dyestuff.

7. Non-poisonous red coloring matters for cosmetic purposes, said coloring matters comprising the mixture of the aluminum lake of eosine, being the precipitate of a solution of eosine with a soluble aluminum in the presence of benzoate of soda, and of the aluminum lake of rhodamin.

8. Non-poisonous red coloring matters for cosmetic purposes, said coloring matters consisting of the aluminum lake of rhodamin and the lake made by precipitating a solution of the red azo-dye-stuffs, obtained by coupling diazotized chlorotoluidine-para-sulfonic acid with beta-naphtol, with barium chloride on a basis of blanc fix and of aluminum hydrate.

9. Non-poisonous red coloring matters for cosmetic purposes, said coloring matters comprising a mixture of aluminum lakes of red dyestuffs, one of said dyestuffs having a carboxylic-group in its molecule.

10. Non-poisonous red coloring matters for cosmetic purposes, said coloring matters comprising the aluminum lake of a red dyestuff, said lake being the precipitate of a water soluble halogen-derivative of fluorescein with a soluble aluminum salt in the presence of benzoate of soda.

In witness whereof we have hereunto set our names this 9th day of June, 1927.

JULIUS CULMANN.
EDGAR AHRENS.